United States Patent [19]
Johnston

[11] Patent Number: 4,967,559
[45] Date of Patent: Nov. 6, 1990

[54] CONTAMINANT ABATEMENT PROCESS FOR GEOTHERMAL POWER PLANT EFFLUENTS

[75] Inventor: Hugh F. Johnston, Palo Alto, Calif.

[73] Assignee: SAI Engineers, Inc., Santa Clara, Calif.

[21] Appl. No.: 352,379

[22] Filed: May 16, 1989

[51] Int. Cl.⁵ .............................................. F03G 7/00
[52] U.S. Cl. ..................................... 60/641.2; 60/685; 210/747; 423/DIG. 19
[58] Field of Search ................... 60/641.2, 641.3, 685; 423/DIG. 19; 210/747

[56] References Cited

U.S. PATENT DOCUMENTS

| | | |
|---|---|---|
| 3,097,926 | 7/1963 | Nicklin . |
| 3,862,545 | 1/1975 | Ellis et al. ............................ 60/641.2 |
| 3,951,794 | 4/1976 | Swearingen ........................ 210/58 |
| 4,091,623 | 5/1978 | Edmondson et al. ............. 60/648 X |
| 4,244,190 | 1/1981 | Lieffers ............................... 60/641.2 |
| 4,259,300 | 3/1981 | Lieffers ............................... 423/224 |
| 4,361,487 | 11/1982 | Hills et al. ........................... 210/759 |
| 4,363,215 | 12/1982 | Sharp ................................. 60/641.2 |
| 4,414,817 | 11/1983 | Jernigan ............................. 60/641.2 |
| 4,428,200 | 1/1984 | McCabe et al. ................... 60/641.5 |
| 4,451,442 | 5/1984 | Jeffrey et al. ...................... 423/224 |
| 4,468,929 | 9/1984 | Jernigan ............................. 60/641.2 |
| 4,469,668 | 9/1984 | Spevack .............................. 60/641.2 |
| 4,489,561 | 12/1984 | Spevack .............................. 60/641.5 |
| 4,528,817 | 7/1985 | Jernigan ............................. 60/641.2 |
| 4,530,211 | 7/1985 | Spervack ............................ 60/641.5 |
| 4,542,625 | 9/1985 | Bronicki ............................. 60/641.2 |
| 4,614,644 | 9/1986 | Lampton, Jr. et al. ............ 423/226 |
| 4,696,802 | 9/1987 | Bedell ................................. 423/226 |
| 4,844,162 | 7/1989 | Maassen et al. ................... 60/641.2 |

OTHER PUBLICATIONS

Dow, GAS/SPEC RT-2 Technology, State-of-the-Art Removal of H₂S from Geothermal Fluids, Form #170-024-84.

Primary Examiner—Allen M. Ostrager
Attorney, Agent, or Firm—Flehr, Hohbach, Test, Albritton & Herbert

[57] ABSTRACT

An improved contaminant abatement process is disclosed which provides effective, cost efficient abatement of contaminants, and particularly hydrogen sulfide and sulfide ions, from geothermal power plant effluents. The process of the present invention is suitable for use with geothermal power plant effluent treatment systems having a primary hydrogen sulfide abatement system for removal of hydrogen sulfide from noncondensable gases, and a secondary hydrogen sulfide abatement system for removal of hydrogen sulfide from condensate. At least a portion of the condensate separated in the primary condenser is diverted for reinjection to the geothermal well prior to treatment in the secondary hydrogen sulfide abatement system. Diversion of at least a portion of the condensate comprising substantial amounts of hydrogen sulfide and sulfide ions reduces the cost of secondary hydrogen sulfide abatement, and reduces the costs involved in abatement of other contaminants.

21 Claims, 1 Drawing Sheet

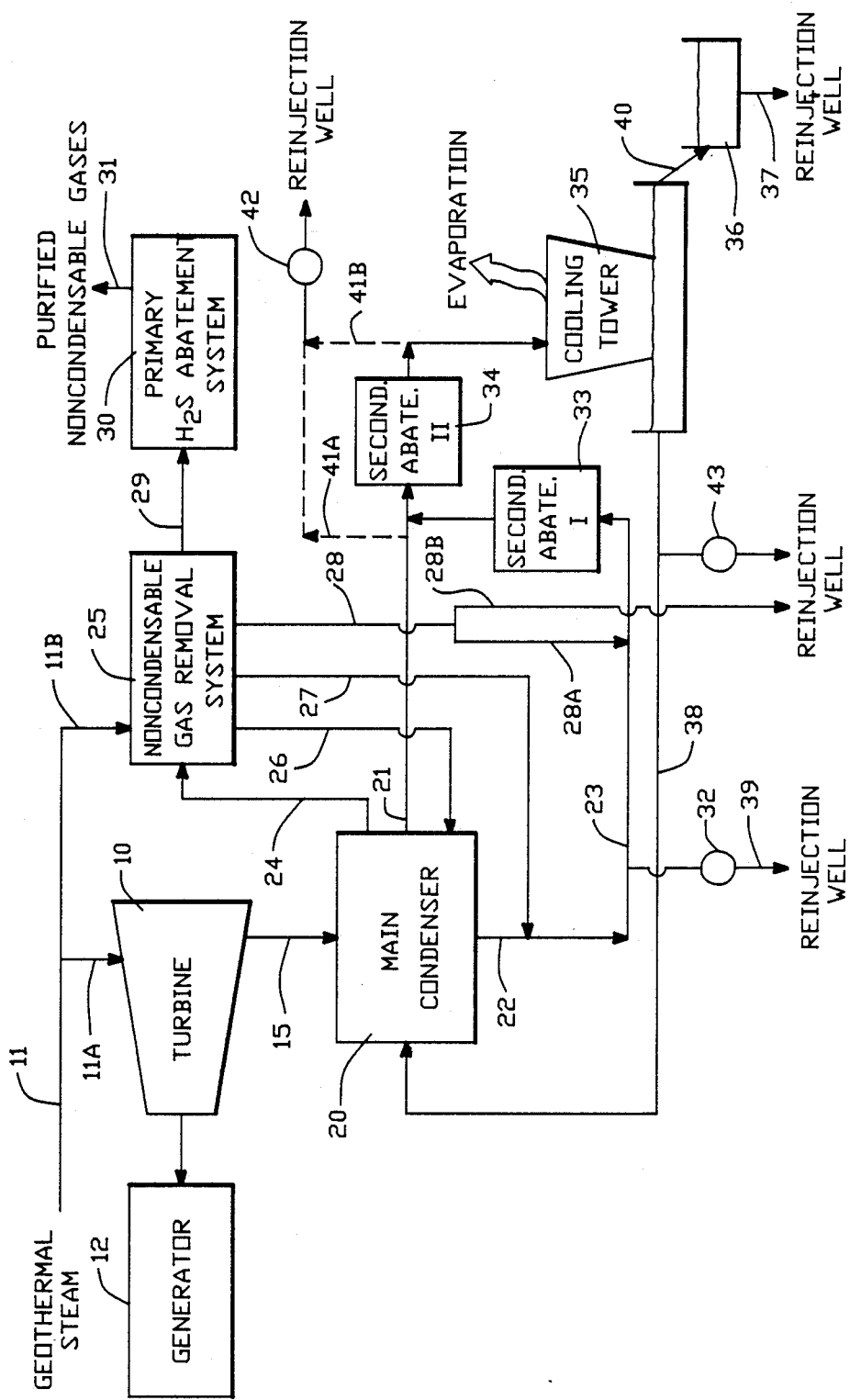

CONTAMINANT ABATEMENT PROCESS FOR GEOTHERMAL POWER PLANT EFFLUENTS

TECHNICAL FIELD

The present invention relates generally to removal of contaminants from effluents discharged from a geothermal power plant, and relates more specifically to an improved contaminant abatement process providing substantially complete, yet cost efficient abatement of sulfur-containing species downstream from a geothermal power plant.

BACKGROUND ART

Generation of power from geothermal heat sources is well established. Geothermal heat sources have been the subject of intensified interest as a resource for both electrical power and for direct use in heating applications during recent energy shortages. Geothermal wells in different geographical areas provide steam and water which vary over a wide range as to pressure, temperature, relative amounts of water and steam, mineral content, and composition and quantity of noncondensable gases. Effluents from power plants fueled by geothermal heat sources typically include a variety of contaminants, such as $CO_2$, $H_2S$, $NH_3$, and $CH_4$. Except for $H_2S$, the natural contaminant levels of these gases may be released to the atmosphere in the effluent. However, regulatory limits on the amount of $H_2S$ requires treatment of the effluent.

Hydrogen sulfide is a flammable, poisonous gas, and release of hydrogen sulfide to the atmosphere may be dangerous to human, animal and plant life. The presence of hydrogen sulfide in the atmosphere moreover produces a noxious, unpleasant odor. The extent to which contaminants such as hydrogen sulfide are present in geothermal power plant effluents varies significantly as to both type and quantity in the known geothermal sources around the world, but substantially complete removal and safe disposal of hydrogen sulfide from geothermal power plant effluents is a universal problem associated with generation of power from geothermal heat sources.

The exhaust flow from a geothermal power plant steam turbine is typically conveyed to a main condenser for separation of aqueous condensate and dissolved materials from the noncondensable gas fraction. The noncondensable gas is compressed to atmospheric pressure by a noncondensable gas removal system. Commonly used noncondensable gas removal systems use steam jet gas ejectors with inter and after condensers or mechanical gas compressors with inter and after coolers; hybrid systems using both ejectors and mechanical gas compressors are in use. The inter and after coolers perform the same function as the inter and after condensers; henceforth the designation "condenser" will include "coolers" used with mechanical gas compressors. Noncondensable gas removal systems can include a precondenser ahead of the first stage of compression.

Two types of condensers are used for the main condenser and for condensers in the gas removal system:
(a) direct contact condensers;
(b) surface (shell and tube) condensers.

The present invention is applicable to systems using a surface condenser for the main condenser. Usually the same type of condenser as the main condenser is used in the noncondensable gas removal system. Hence when the present invention is applicable, the condensers in the gas removal system will usually also be surface condensers. Direct contact condensers in the noncondensable gas removal system are also applicable in the present invention; however, surface condensers are preferred.

When employing surface condensers, generally from less than 5% up to about 40% of the hydrogen sulfide present in the geothermal steam is dissolved in the geothermal steam condensate. The remainder of the hydrogen sulfide, from more than 95% down to about 60%, is discharged from the noncondensable gas removal system in the noncondensable gas fraction. Hydrogen sulfide present in the noncondensable gas fraction may then be removed by a primary hydrogen sulfide abatement system which absorbs hydrogen sulfide from the gas stream.

Removal of dissolved hydrogen sulfide from the geothermal steam condensate or from the circulating water is generally accomplished by means of a secondary hydrogen sulfide abatement system, which typically involves the introduction of chemical agents in solution with the dissolved hydrogen sulfide. Condensate produced by the main surface condenser and by surface condenser(s) in the noncondensable gas removal system can be treated either before being added to the circulating water or treatment can occur in the circulating water.

In an alternative combined primary and secondary hydrogen sulfide abatement system, the noncondensable gases are burned to produce sulfur dioxide which is scrubbed from the effluent gas using caustic. In this abatement process, iron chelate is used to convert dissolved hydrogen sulfide to elemental sulfur and water. The elemental sulfur is converted to soluble thiosulfate by reaction with the sulfite ions which are produced by the primary process scrubber.

One commonly used process for removal of hydrogen sulfide from geothermal steam condensate uses hydrogen peroxide to produce elemental sulfur and soluble sulfur compounds. Typically chelated iron is used to catalyze the reaction.

Another process for secondary hydrogen sulfide abatement involves the introduction of ferric chelate in the circulating water loop. Dissolved hydrogen sulfide is oxidized to sulfur by ferric chelate, while the ferric chelate is reduced to ferrous chelate. Ferrous chelate is then converted in the cooling tower, in the presence of air, to ferric chelate, and the ferric chelate is recirculated for continuing secondary hydrogen sulfide abatement. Additional ferric chelate is added as makeup to compensate for chemical lost in the blowdown from the system and to maintain a sufficient concentration (excess stoichiometric amount) of ferric chelate to react with substantially all dissolved hydrogen sulfide in the circulating water. Although the secondary hydrogen sulfide abatement systems which are described immediately above are effective, they require substantial quantities of expensive chemicals such as hydrogen peroxide and/or ferric chelate. An object of the present invention is to reduce the consumption of these chemicals, by making the overall abatement system more efficient.

DISCLOSURE OF THE INVENTION

The present invention is directed to an effective, cost-efficient process for removal of contaminants, and particularly sulfur-containing species such as hydrogen sulfide, from geothermal power plant effluents. The process of the present invention is suitable for use with geothermal power plant systems having a primary contaminant abatement system for removal of contaminants from noncondensable gases, and a secondary contaminant abatement system for removal of contaminants which are dissolved in the geothermal stem condensate.

The process of the present invention includes the following steps: (a) condensing geothermal turbine exhaust steam (and steam jet ejectors steam, if ejectors are used) to produce: (1) condensate comprising an aqueous solution containing dissolved contaminants, and (2) a noncondensable gas (NCG) fraction containing contaminants; (b) processing the noncondensable gas fraction in a primary contaminant abatement system for removal of the contaminants; (c) diverting a fraction of the condensate directly to geothermal reinjection well(s); and (d) processing the remaining fraction of the condensate in a secondary contaminant abatement system for removal of dissolved contaminants. Diversion of a fraction of the condensate for direct reinjection takes place prior to treatment in the secondary contaminant abatement system. This process thus provides a reduction in the volume of condensate which undergoes secondary contaminant abatement treatment, and provides a corresponding reduction in the quantity of chemical additives required for secondary contaminant abatement, without increasing the load on the primary contaminant abatement system. The process of the present invention is especially suitable for treatment of geothermal power plant effluents comprising substantial quantities of hydrogen sulfide and incorporating primary and secondary hydrogen sulfide abatement systems.

In accordance with the preferred embodiments of the process of the present invention, geothermal turbine exhaust steam is first condensed in a main condenser to produce condensate containing substantial amounts of dissolved sulfur-containing species and a noncondensable gas fraction. The noncondensable gas fraction withdrawn from the main condenser is compressed in a noncondensable gas removal system, which produces additional condensate containing additional dissolved sulfur-containing species separated from the noncondensable gas fraction. A preferred embodiment is to merge the above two condensate flows together prior to diverting a portion of the mixture to direct reinjection; the remainder of the mixture is treated by the secondary contaminant abatement system. If the concentration of contaminant(s) in the condensate from the noncondensable gas removal system is much lower than it is in the main condenser condensate, then performance of the system may be improved by diverting the lower concentration condensate directly to the secondary contaminant abatement system.

Diversion of a portion of the condensate for direct reinjection is regulated to provide sufficient make-up water to the geothermal power plant circulating water system. Thus, according to a preferred embodiment of the present invention, diversion of the direct reinjection fraction is regulated automatically to provide for the proper quantity of make-up water to offset cooling tower evaporation and blowdown. Diversion of a portion of the condensate is regulated to maintain the concentration if dissolved solids in the circulating liquid below a predetermined level.

Diversion of a portion of the condensate to geothermal reinjection well(s) reduces the load on the secondary hydrogen sulfide abatement system, and thus reduces the secondary abatement chemical additive requirements. Consequently, the process of the present invention provides a substantial reduction in the cost of secondary hydrogen sulfide abatement, while still providing substantially complete removal of hydrogen sulfide from geothermal power plant effluents. The process of the present invention additionally reduces the costs involved in abatement of other contaminants by direct reinjection of a portion of the geothermal steam condensate.

BRIEF DESCRIPTION OF THE DRAWINGS

The above-mentioned and additional features of the present invention and the manner of obtaining them will become apparent, and the invention will be best understood by reference to the following more detailed description read in conjunction with the accompanying schematic flow diagram illustrating preferred embodiments of the process of the present invention for abatement of sulfur-containing species in effluents from a geothermal power plant.

BEST MODE OF CARRYING OUT THE INVENTION

As shown in the FIGURE, geothermal steam is conveyed from geothermal well or wells through inlet conduits 11 and 11A to turbine 10. Optionally, steam ejectors (not shown) may be included within the NCG removal system 25 and receive steam via line 11B. Output energy from turbine 10 may be used to generate power, such as electrical power, in generator 12. Suitable generators and turbines for utilizing geothermal steam are well known in the art.

Effluent steam is withdrawn from turbine 10 through conduit 15 and is conveyed to main condenser 20, wherein noncondensable gases are separated from condensate comprising an aqueous solution with dissolved solids. Both direct contact condensers and indirect contact (surface) condensers have been utilized in geothermal power plants. A surface condenser is required for use as the main condenser 20 according to the present invention.

A noncondensable gas fraction is withdrawn from main condenser 20 through conduit 24 and noncondensable gas removal system 25; it is then conveyed through conduit 29 for treatment in primary hydrogen sulfide abatement system 30. Sulfur-containing species in the noncondensable gas fraction are converted to usable or environmentally harmless sulfur or sulfur compounds in primary hydrogen sulfide abatement system 30. Suitable primary hydrogen sulfide abatement systems for removal of hydrogen sulfide from noncondensable gases are well known in the art. Purified noncondensable gases may be released to the atmosphere or conveyed for other useful purposes through outlet conduit 31.

Condensate comprising an aqueous solution containing dissolved solids and substantial amounts of dissolved sulfur-containing species is withdrawn from main condenser 20 through condensate conduits 22 and 23. Condensate is conveyed through condensate conduit 23 for introduction to return pipe 21 to cooling tower 35. A portion of the condensate is diverted from conduit 23 by flow control valve 32 into direct reinjection conduit 39 to geothermal reinjection well(s).

Noncondensable gas removal system 25 uses steam jet gas ejectors (not shown) and/or mechanical gas compressors (not shown) to compress the noncondensable gases to atmospheric pressure. The noncondensable gas removal system 25 usually includes one or more condensers (not shown) to cool the noncondensable gas and remove water vapor from it; geothermal steam condensate is produced. Noncondensable gases are withdrawn from noncondensable gas removal system 25 through withdrawal conduit 29 and are conveyed to primary hydrogen sulfide abatement system 30. Condensate containing substantial amounts of dissolved hydrogen sulfide separated from noncondensable gases in noncondensable gas removal system 25 is withdrawn through one or more condensate withdrawal conduits 26, 27, or 28. Conduit 26 mixes the two condensate flows in the main condenser 20; conduit 27 mixes them in conduit 22. Either one or both conduits 26 and 27 may be used to implement the present invention. If the concentration of contaminants in one or more condensate flows from the noncondensable gas removal system 25 is significantly less than the concentration in conduit 22, then conduit 28A may be used. Conversely, if the concentration of contaminants in conduit 28 is significantly greater than the concentration in conduit 22, then conduit 28B to direct reinjection may be used.

The mixture of circulating water and condensate is conveyed to cooling tower 35, wherein evaporation of a substantial amount of water takes place. Cooled water is recirculated from cooling tower 35 through conduit 38 for use in main condenser 20, or to other noncondensable gas removal system condensers (not shown) and other heat exchangers (not shown).

Excess water leaves the system as cooling tower blowdown. Once out of the system, where the blowdown goes has no effect on the system, of course. However, typically, the blowdown is disposed of in geothermal reinjection well(s). Alternate blowdown paths to geothermal reinjection well(s) or other disposal are shown in the FIGURE as follows:

(a) cooling tower basin overflow 40 via sump 36 and conduit 37;
(b) from conduit 21 via conduits 41A or 41B and control valve 42;
(c) from conduit 38 via control valve 43.

Control valves 42 or 43 are preferably controlled by a typical level sensor in the cooling tower basin. The process of the present invention is the same for alternates (a), (b), and (c) immediately above.

The secondary hydrogen sulfide abatement system for removal of dissolved sulfur-containing species from condensate typically involves addition of chemicals such as hydrogen peroxide and/or chelated iron to react with the dissolved hydrogen sulfide condensate. Several different methods for secondary hydrogen sulfide abatement are known in the art and would be suitable for use in the practice of the present invention. According to preferred embodiments of the process of the present invention, secondary hydrogen sulfide abatement is initiated downstream from flow control valve 32 and upstream from cooling tower 35. Secondary hydrogen sulfide abatement is achieved by introduction of secondary hydrogen sulfide abatement chemical additives in excess stoichiometric quantities to condensate and/or circulating fluid downstream from flow control valve 32 and upstream from cooling tower 35.

A substantial portion of the combined condensate from condenser 20 and in noncondensable gas removal system 25 is diverted through control valve 32 and conduit 39 to the geothermal reinjection well(s). Direct reinjection of a portion of the combined condensate reduces the quantity of chemical additives required for secondary hydrogen sulfide abatement, and provides significant overall process cost reductions. If mechanical compressor(s) are used for a compression stage in the noncondensable gas removal system 25, the hydrogen sulfide concentration in the condensate from that stage will be substantially less than that in the primary condensate (in lines 22 and 23), and withdrawal of the secondary condensate through conduit 28A for introduction to the primary condensate downstream from flow control valve 32 and upstream from cooling tower 35 will be preferred.

According to the process of the present invention, when hydrogen peroxide is used for secondary abatement, the reaction between it and dissolved hydrogen sulfide will occur in secondary abatement system 33 after some of the condensate has been diverted through valve 32 for direct reinjection. Chelated iron is typically used to catalyze the reaction; the required concentration of iron in the condensate is independent of the concentration of dissolved hydrogen sulfide. The fractional reduction in secondary abatement chemical additive requirements is accordingly proportional to the fraction of condensate which is diverted for reinjection to the geothermal well prior to secondary hydrogen sulfide abatement.

An entirely different process for removal of dissolved hydrogen sulfide does not treat the condensate in conduit 23; instead removal of dissolved hydrogen sulfide takes place in abatement system 34 after the condensate in conduit 23 is mixed with the circulating water. Chelated iron is added to the circulating water; it will be in the ferric form in conduits 38 and 21. The dissolved hydrogen sulfide is oxidized to elemental sulfur and water, while the ferric chelate is reduced to ferrous chelate. Ferrous chelate is then converted in the cooling tower 35, in the presence of air, to ferric chelate which is recirculated for continuing hydrogen sulfide abatement. Additional iron chelate is added in system 34 to the circulating water loop to compensate for chemical lost in the blowdown from the system. Additional savings due to reduction of secondary abatement chemical additive requirements are realized, according to the present invention, since diversion of a portion of the condensate for reinjection to the geothermal well significantly reduces the amount of excess water which is withdrawn from the system as blowdown. Consequently, the quantity of secondary abatement chemical additives lost in the blowdown is significantly reduced. Flow control valve 32 is provided to regulate the flow of geothermal steam condensate to reinjection conduit 39 for direct reinjection. The remainder of the geothermal steam condensate flows through conduit 23 for treatment in secondary hydrogen sulfide abatement system 33 and/or 34. Flow control valve 32 preferably incorporates automated control means to regulate diversion of the direct reinjection fraction so that sufficient geothermal steam condensate is added to the circulating water to provide make-up water to replace cooling tower evaporation and blowdown. Variations in geothermal steam flow quantity into the power plant and environmental conditions, such as temperature, humidity, barometric pressure, wind velocity and wind direction influence the rate of evaporation from cooling tower 35, and consequently influence the required make-up water quantity. The geothermal steam condensate quantity which is greater than the required make-up water quantity is diverted through control valve 32 to direct reinjection. The geothermal steam condensate flow quantity is preferably measured downstream from flow control valve 32. The quantity of circulating water system blowdown is also measured, and these measurements are used to compute the signal to flow control valve 32. The volume of condensate diverted through reinjection conduit 39 for reinjection to the geothermal well, and the volume of liquid withdrawn from the system as blowdown are adjusted as necessary to compensate for variations in environmental conditions to provide the minimum required make-up water quantity. Diversion of condensate via control valves 32, 42 and 43 for reinjection to the geothermal well(s) is also regulated to maintain the concentration of dissolved solids in the circulating liquid below a predetermined level. Diversion of a portion of the condensate for reinjection to the geothermal well reduces the secondary abatement chemical additive requirement, which, in turn, permits diversion of additional condensate for reinjection to the geothermal well.

The process of the present invention has been described with reference to a schematic flow diagram which illustrates a simplified geothermal power plant effluent steam treatment system. The placement of pumps, heat exchange means, and the like is not illustrated, but the provision and placement of suitable pumps, heat exchange means, and the like, is well known in the art. Additional process enhancements, which are known in the art, may also be utilized without departing from the essential features of the process of the present invention.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A process for abatement of contaminants in effluents discharged from a geothermal power plant comprising:
    condensing on a surface condensing means, geothermal power plant effluents to separate a condensate comprising an aqueous solution containing dissolved contaminants from a noncondensable gas fraction containing contaminants;
    processing said noncondensable gas fraction in a primary contaminant abatement system for removal of said contaminants from said noncondensable gas fraction;
    diverting a reinjection fraction of said condensate for reinjection to a geothermal well; and
    processing at least a fraction of the remaining portion of said condensate in a secondary contaminant abatement system for removal of said dissolved contaminants from said condensate.

2. A process according to claim 1, additionally comprising the step of separating a secondary condensate containing dissolved contaminants from said noncondensable gas fraction prior to processing in said primary contaminant abatement system, and diverting a reinjection fraction of said secondary condensate for reinjection to said geothermal well.

3. A process according to claim 2, additionally comprising the step of processing at least a fraction of the remaining portion of said secondary condensate in said secondary contaminant abatement system for removal of said dissolved contaminants after diverting said reinjection fraction of said secondary condensate.

4. A process according to claim 3, additionally comprising the step of mixing said secondary condensate with said primary condensate to form a combined condensate and diverting a reinjection fraction of said combined condensate for reinjection to said geothermal well.

5. A process according to claim 4, additionally comprising the step of mixing said secondary condensate with said primary condensate in said primary condenser.

6. A process according to claim 5, additionally comprising the step of mixing said secondary condensate with said primary condensate downstream from said primary condenser and upstream from diversion of said reinjection fraction to said geothermal well.

7. A process according to claim 3, additionally comprising the step of mixing said secondary condensate with said primary condensate downstream from said primary condenser and upstream from diversion to said geothermal well.

8. A process according to claim 1, wherein said condensate comprises a secondary condensate produced by condensing said noncondensable gas fraction prior to processing in said primary contaminant abatement system.

9. A process according to claim 1, additionally comprising the step of condensing said geothermal power plant effluents in a primary condenser to produce a primary condensate comprising an aqueous solution containing dissolved contaminants, withdrawing said primary condensate from said primary condenser, conveying said primary condensate in a primary condensate conduit to a flow control valve, and regulating the flow of said primary condensate by means of said flow control valve for diversion of said reinjection fraction to said reinjection well and for conveyance of a remaining fraction of said primary condensate through a condensate conduit to a cooling tower.

10. A process according to claim 9, additionally comprising the step of withdrawing circulating liquid from said primary condenser and conveying said circulating liquid in a liquid circulation means to said cooling tower, and recirculating liquid from said cooling tower to said primary condenser in a liquid recirculation means.

11. A process according to claim 10, additionally comprising the step of separating a secondary condensate containing dissolved contaminants from said noncondensable gas fraction prior to processing in said primary contaminant abatement system, diverting a reinjection fraction of said secondary condensate for reinjection to said geothermal well, and processing a remaining fraction of said secondary condensate in said secondary contaminant abatement system for removal of said dissolved contaminants from said secondary condensate after diverting said reinjection fraction for reinjection to said geothermal well.

12. A process according to claim 11, additionally comprising the step of mixing said secondary condensate with said primary condensate to form a combined condensate prior to diverting said primary and secondary condensates for reinjection, and diverting a portion of said combined condensate for reinjection.

13. A process according to claim 12, additionally comprising the step of mixing said secondary condensate with said primary condensate in said primary condenser.

14. A process according to claim 12, additionally comprising the step of mixing said secondary condensate with said primary condensate in said primary condensate conduit.

15. A process according to claim 19, additionally comprising the step of maintaining a substantially constant flow of liquid in said liquid circulation means and said liquid recirculation means.

16. A process according to claim 15, additionally comprising the step of withdrawing liquid from said cooling tower as blowdown, measuring said liquid withdrawn as blowdown, measuring said reinjection fraction, and adjusting said liquid withdrawn as blowdown and said reinjection fraction to maintain said constant flow of liquid.

17. A process according to claim 16, additionally comprising the step of automatically controlling said reinjection fraction to maintain said constant flow of liquid.

18. A process according to claim 10, additionally comprising the step of maintaining the concentration of dissolved solids in said liquid circulation means and said liquid recirculation means below a predetermined level.

19. A process according to claim 1 wherein said contaminants include sulfur-containing species, said primary contaminant abatement system comprises a primary hydrogen sulfide abatement system for removal of hydrogen sulfide from said noncondensable gas fraction, and said secondary contaminant abatement system comprises a secondary hydrogen sulfide abatement system for removal of hydrogen sulfide from said primary condensate.

20. A process according to claim 19, wherein substantially all sulfur-containing species are removed from said noncondensable gas fraction in said primary hydrogen sulfide abatement system and substantially all dissolved sulfur-containing species are removed from said primary condensate in said secondary hydrogen sulfide and sulfide ion abatement system.

21. In a process for abatement of contaminants in effluents discharged from a geothermal power plant wherein geothermal power plant effluents are condensed in a primary condenser to separate a primary condensate comprising an aqueous solution containing dissolved contaminants, from a noncondensable gas fraction containing contaminants, the noncondensable gas fraction is processed in a primary contaminant abatement system for removal of contaminants, the primary condensate is processed in a secondary contaminant abatement system for removal of dissolved contaminants, the improvement comprising: diverting a reinjection fraction of said primary condensate for reinjection to a geothermal well prior to processing said primary condensate in said secondary contaminant abatement system.

* * * * *